United States Patent [19]

Kojima et al.

[11] Patent Number: 5,326,678
[45] Date of Patent: Jul. 5, 1994

[54] HIGH DIELECTRIC POLYMERIC OPTICAL RECORDING MEDIUM

[75] Inventors: Akio Kojima, Mitaka; Takeo Yamaguchi, Kamiitabashi; Masao Yoshikawa, Yokohama; Isamu Shibata, Fuchu; Kaoru Teramura, Hino, all of Japan

[73] Assignee: Ricoh Company Ltd., Tokyo, Japan

[21] Appl. No.: 873,667

[22] Filed: Apr. 23, 1992

Related U.S. Application Data

[63] Continuation of Ser. No. 366,447, Jun. 15, 1989, abandoned.

[30] Foreign Application Priority Data

Jun. 15, 1988 [JP] Japan .................. 63-145808
Sep. 28, 1988 [JP] Japan .................. 63-240826
Oct. 31, 1988 [JP] Japan .................. 63-273244

[51] Int. Cl.$^5$ .................................................. G11B 7/24
[52] U.S. Cl. ...................................... 430/495; 430/19; 430/271; 430/945; 250/338.3; 369/110
[58] Field of Search .............. 430/495, 270, 271, 945, 430/19; 250/338.3; 365/107, 109, 117, 146, 147; 369/13, 110

[56] References Cited

U.S. PATENT DOCUMENTS

| | | | |
|---|---|---|---|
| 3,872,318 | 3/1975 | Murayama | 365/146 |
| 4,529,688 | 7/1985 | Law et al. | 430/494 |
| 4,566,086 | 1/1986 | Anderson | 369/113 |
| 4,725,525 | 2/1988 | Kenney et al. | 430/270 |
| 4,731,754 | 3/1988 | Ogden et al. | 365/121 |
| 4,946,762 | 8/1990 | Albert et al. | 430/270 |
| 4,983,318 | 1/1991 | Matsumoto et al. | 252/299.01 |
| 5,024,926 | 6/1991 | Itoh et al. | 430/495 |
| 5,030,827 | 7/1991 | Powell | 250/338.1 |

FOREIGN PATENT DOCUMENTS 63-046638 2/1988 Japan .
2142494 1/1985 United Kingdom ............... 365/117

Primary Examiner—Charles L. Bowers, Jr.
Assistant Examiner—John A. McPherson
Attorney, Agent, or Firm—Oblon, Spivak, McClelland, Maier & Neustadt

[57] ABSTRACT

A high dielectric polymeric optical recording medium for recording information by heating the portions of the recording medium corresponding to the information to be recorded by being exposed to a beam of light, followed by the application of a reverse electric field to the recording medium, thereby selectively reversing the polarity of the heated portions in the recording medium, is disclosed, which comprises a high dielectric polymeric recording layer containing a high dielectric polymeric composition comprising a high dielectric polymeric material and a nonionic dye serving as a light-absorption agent which is compatible with or dispersible in the high dielectric polymeric material.

18 Claims, 4 Drawing Sheets

TIME

TIME

TIME

TIME

HIGH DIELECTRIC POLYMERIC OPTICAL RECORDING MEDIUM

This application is a continuation of application Ser. No. 07/366,447, filed on Jun. 15, 1989, now abandoned.

BACKGROUND OF THE INVENTION

1. Field of the Invention

This invention relates to an improved polymeric reversible optical recording medium having high dielectricity, which comprises a recording layer containing a high dielectric polymeric material and a nonionic dye, and is employable for devices, such as a photosensor, a pyroelectric sensor and a display, which utilize the pyroelectric property of high dielectric polymeric materials.

2. Discussion of Background

Recording media using high dielectric polymeric materials are widely known, and recording methods by which information is recorded in such recording media can be classified into the following three types.

The first type of the recording method is disclosed in, for example, Japanese Laid-Open Patent Applications 59-215096, 59-215097 and 61-105792. According to this method, information is recorded in a high dielectric optical recording medium by impressing an electric field to the recording medium using crossed-type electrodes, and polarizing it. The recorded information is reproduced by applying a light beam to the recorded area, and detecting whether a pyroelectric current is generated or not. The portion where the pyroelectric current is generated corresponds to the recorded bit.

The second recording method is such that information is recorded by depolarizing a once polarized portion of a high dielectric recording medium. The thus recorded information can be reproduced by applying a light beam weaker than the one used for information recording, and detecting whether a pyroelectric current is generated or not. The portion where no pyroelectric current is generated corresponds to the recorded bit; this is contrary to the first method. Such a recording method is disclosed, for instance, in Japanese Laid-Open Patent Applications 59-215096 and 59-215097.

The third recording method, reported in the "IEEE Trans. Electr. Ins." El-21, 539 (1986) and the "KOBUNSHI KAKO" 35, 418 (1986), is as follows. In general, a coercive electric field in a dielectric hysterisis curve, which curve is obtained when an alternating current field is impressed to a high dielectric material, decreases as a rise in temperature. A high dielectric recording medium is polarized because of such a property of high dielectric materials. While impressing a reverse electric field which is too weak to diverse the polarization, a light beam is applied to the polarized recording medium. The temperature of the light-beam-applied portion rises to the Curie temperature, and the polarization of this portion is diversed. Thus, information is recorded in the recording medium. The recorded information can be reproduced by applying a light beam which is weaker than the one used for information recording, and detecting the phase difference (positive and negative) in the pyroelectric current generated.

The maximum amount of the pyroelectric current generated in the first information recording method corresponds to Pt, the one generated in the second method also corresponds to Pr, and the one generated in the third method corresponds to 2Pt, where "Pt" denotes the residual polarized amount at room temperature. This means that the C/N ratio in the third method is much better than those in the first and second methods.

In order to improve the recording density in the first information recording method, it is necessary to employ finely processed electrodes; this requires higher manufacturing cost. In the second method, the recorded information cannot be partially erased. The third method is therefore considered the best one so far.

However, the most desirable structure of an optical recording medium for use in the third recording method has not yet been fixed. Recording and reproduction of information is performed by heat which is generated by a light applied to the recording medium, so that the light absorption efficiency of the recording medium is a very important factor when the third recording method is employed.

The conventional optical recording medium comprising a recording layer made of a high dielectric polymer, especially polyvinylidene (hereinafter referred to as PVD), has high light-transmission, so that it has low sensitivity. It is therefore required to use a high out-put laser for information recording. The above conventional optical recording medium is thus impractical.

Japanese Laid-Open Patent Application 63-46638 discloses a high dielectric polymeric optical recording medium comprising a dye, dispersed in a recording layer, which absorbs a light having a wavelength in the vicinity of the wavelength of a semiconductor laser beam. When information is recorded in the above recording medium, the medium is exposed to the severe conditions of high temperature and high voltage. Consequently, the dye contained in the recording medium is dissociated or decomposed after the repeated use of the recording medium, and decolored. For this reason, the recording medium of this type is also unpractical.

As described above, the high dielectric polymeric optical recording medium is exposed to the conditions of high heat and strong electric field, much severer than the conditions to which any other heat-mode optical recording media are exposed.

Since ionic dyes cannot stand such severe conditions, it is improper to employ ionic dyes in the high dielectric polymeric optical recording medium. For instance, when a cyanine dye, one of cationic dyes, is employed as a laser beam-absorbing material, it is dissociated or decomposed due to high heat and strong electric field, and decolored, resulting in a loss of the semiconductor-laser-beam absorptibity. The results of elementary analysis of the decolored dye, which was carried out by means of the secondary ion mass spectrometric analysis, are shown in FIG. 7. The chart in FIG. 7 demonstrates that chlorine ions, counter ions of the dye employed, are distributed near the electrodes with high density.

In order to utilize the pyroelectric current generated in high dielectric polymeric materials, it is necessary to impress a high electric field, irrespective of the recording methods as described above, in the course of both information recording and erasing processes. Therefore, if the recording layer contains defects or electrically chargeable impurities therein, it is easily damaged by electric discharge. It is however very difficult, from the technical and economical points of view, to prepare a recording layer which is perfectly free from such impurities or defects.

Furthermore, it is essential to employ electrodes in the recording method which utilizes the pyroelectric current generated. In general, materials for the electrode have a thermal conductivity higher than that of the materials for the recording layer. Consequently, thermal fusion at the interface between the electrode and the recording layer becomes high, and information recording with high density cannot be expected.

The conventional high dielectric polymeric optical recording media have the above-described shortcomings, so that they cannot be used practically.

SUMMARY OF THE INVENTION

Accordingly, a first object of the present invention is to provide a practical optical recording medium comprising a high dielectric polymeric recording layer which contains a high dielectric polymeric composition comprising a high dielectric polymeric material and a nonionic dye serving as a light-absorption agent. Information is recorded in this optical recording medium in such a method that the portions of the recording medium corresponding to the information to be recorded is heated by exposing to a beam of light, and then a reverse electric field is applied to the recording medium to selectively reverse the polarity of the heated portions in the recording medium.

A second object of the present invention is to provide an optical recording medium free from spark discharge which is commonly caused when a high electric field is impressed, having high recording sensitivity, and capable of being recorded with high density.

The first object of the present invention can be attained by a high dielectric polymeric optical recording medium comprising a recording layer which comprises a high dielectric polymeric composition comprising a high dielectric polymeric material and a nonionic dye which is compatible with or dispersible in the high dielectric polymeric material.

The second object of the present invention can be attained by a high dielectric polymeric optical recording medium comprising the above-mentioned recording layer; an insulation layer formed on the recording layer; and an electrode layer formed on the insulation layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the accompanying drawings, the structure of the present invention will be explained in detail.

Figure 1:
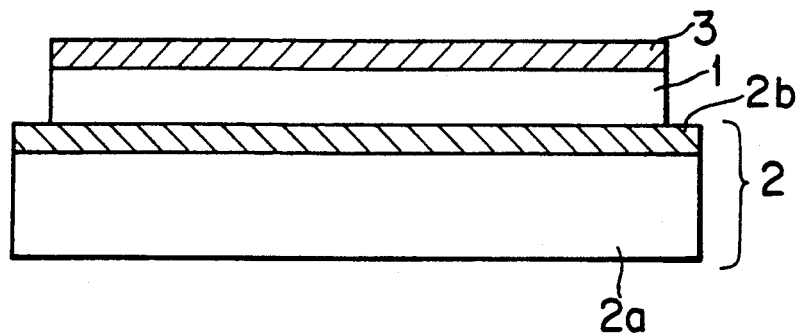
FIGS. 1 to 4 are schematic cross-sectional views of optical recording media according to the present invention.

FIG. 1 a schematic illustration of a high dielectric polymeric optical recording medium according to the present invention, comprising a recording layer in which a nonionic dye is dispersed. In this figure, reference numeral 1 designates a recording layer made of a high dielectric polymeric film, such as a PVD film, in which the nonionic dye is dispersed, reference numeral 2a designates a substrate, reference numeral 2b designates a lower electrode, and reference numeral 3 designates an upper electrode.

The nonionic dyes to be incorporated into the high dielectric polymer should not impede the dielectric property of the polymer. It is therefore preferable that the nonionic dyes have the following properties.

(1) Having a molar absorbancy index ($\epsilon$) of $10^4$ $mol^{-1} \cdot l \cdot cm^{-1}$ or more near the wavelength of an application light, especially of a semiconductor laser beam.

(2) Soluble in a solvent in which the high dielectric polymeric material is dissolved.

(3) Having high resistance to electricity.

(4) Thermally stable.

(5) Compatible with or dispersible in the high dielectric polymer into which the dye is incorporated.

(6) Having low electric conductivity ($10^{13}$ $\Omega \cdot cm$ or more).

A preferable amount of the nonionic dye incorporated into the recording layer is less than 5 wt. % of the amount of the high dielectric polymer contained in the recording layer. The thickness of the recording layer is generally 0.3 to 5 $\mu m$, preferably 2 to 3.5 $\mu m$.

Examples of the nonionic dyes having the above-mentioned properties include phthalocyanine dyes, naphthalocyanine dyes, benzene dithiol dyes, naphthoquinone dyes, and anthraquinone dyes.

Typical examples of the phthalocyanines are those having the following formula (I):

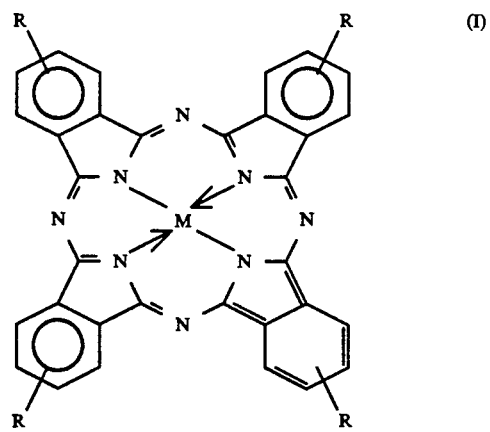

wherein

M represents tin, zinc, titanium, vanadium, and indium; and

R represents an alkyl group having 1 to 22 carbon atoms, an alkoxyl group having 1 to 22 carbon atoms, halogen, an amino group, an amino group substituted with an alkyl or alkoxyl group having 1 to 10 carbon atoms.

Figure 7:
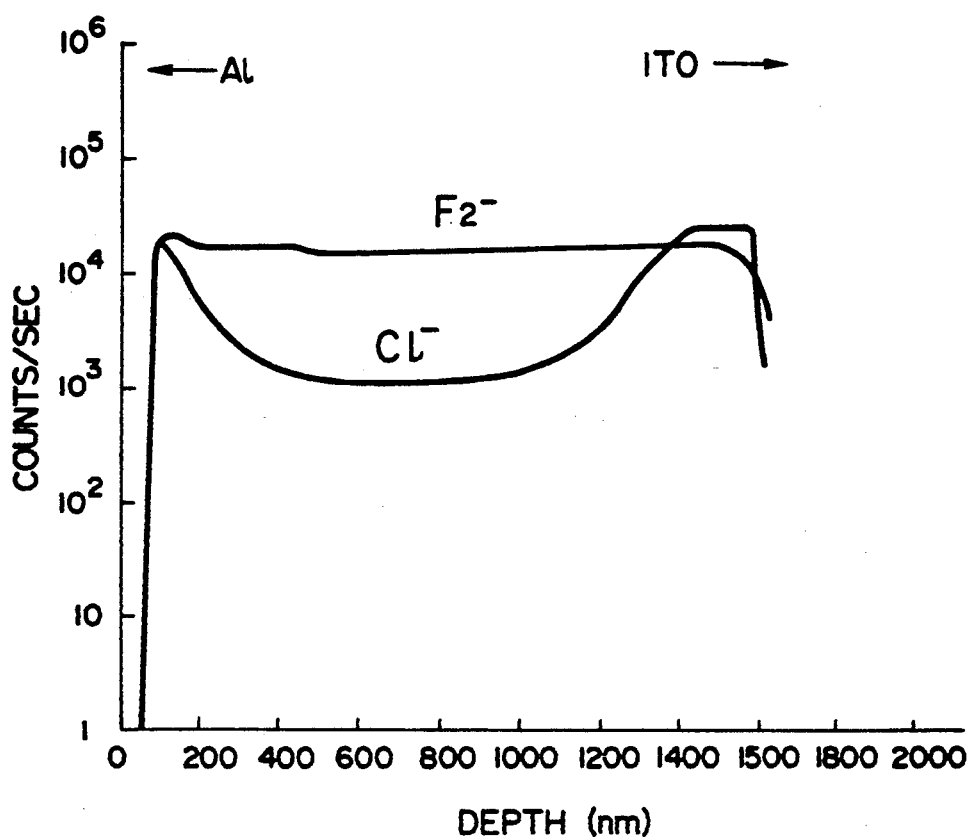
FIG. 7 is a graph showing the results of secondary ion mass spectrometric analysis of the recording medium prepared in Comparative Example 3.
Figure 8:
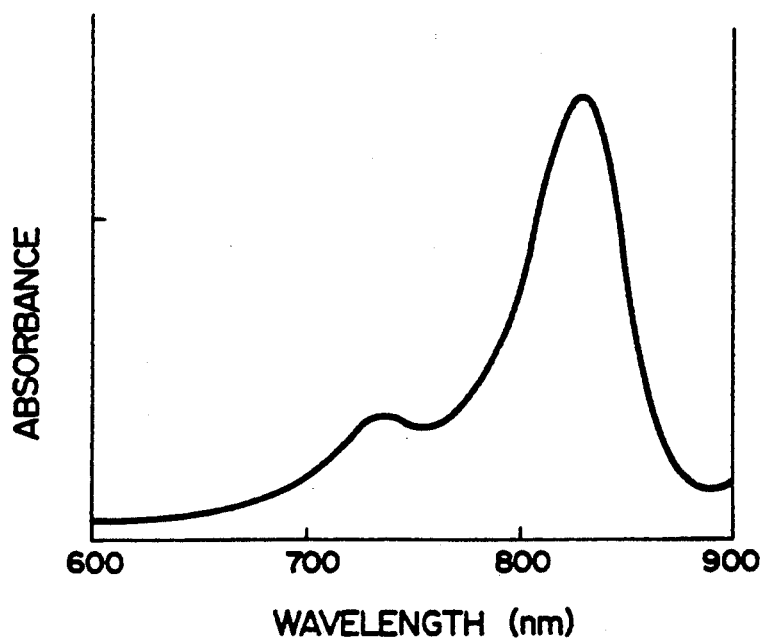
FIG. 8 is a graph showing an absorption curve of a phthalocyanine dye in a state of a dimethylformamide (DMF) solution used in Example 5.

Of the above compounds, those having amino groups or derivatives thereof are preferable. The absorption characteristics of the phthalocyanine in a DMF solution, used in Example 5, is shown in FIG. 7.

When the phthalocyanine dye having formula (I) contains, as an inclusion metal M, a metal such as tin, zinc, titanium, vanadium or indium, or a compound thereof, the dye can absorb a light having a longer wavelength than a light absorbed by those dyes without containing the above metal or the compound thereof.

The substituents Rs are introduced as the terminal groups so as to improve the solubility of the phthalocyanine dye.

The phthalocyanine dyes having formula (I) may be bonded to a side chain of polystyrene, acrylic resin or polyvinyl amine as shown below:

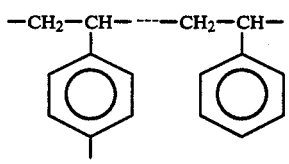 (II)

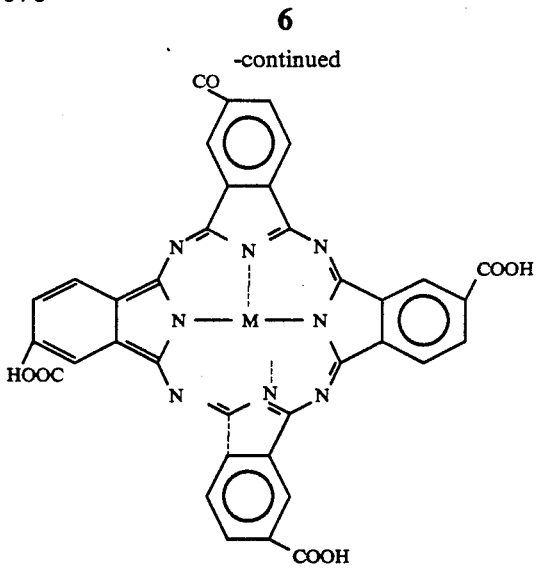

Naphthalocyanine dyes employable in the recording layer of the recording medium according to the present invention are those having the following formula (III):

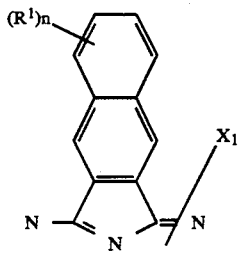 (III)

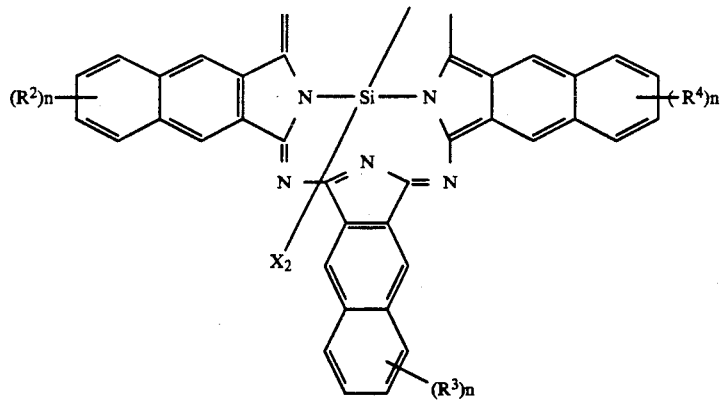

wherein $R^1$, $R^2$, $R^3$, $R^4$ are identical or different, and represent a linear or branched alkyl group having 1 to 22 carbon atoms or halogen;

n is identical or different, and represents an integer of from 0 to 6; and $X^1$ and $X^2$ are identical or different, and represent a group selected from the group consisting of —R, —Ar, —OR, —OAr, —OSi(R)$_3$, —OSi(OR)$_3$ and —OSi(OAr)$_3$, in which R represents a linear or branched alkyl group having 1 to 22 carbon atoms, and Ar represents a group selected from the group consisting of a phenyl group, a substituted phenyl group, a benzyl group and a substituted benzyl group.

These naphthalocyanine compounds can be synthesized by a method reported in the "Journal of American Chemical Society" 106, pp. 7404-7410 (1984).

The center metal of the naphthalocyanine dye is not limited to Si. A naphthalocyanine dye containing, instead of Si, a metal such as copper, tin, zinc, lead, titanium, tantalum, vanadium or indium, or a compound thereof is also employable in the present invention. However, the solubility in the solvent of such naphthalocyanine dyes is lower than that of the naphthalocyanine dye containing Si as the center metal. Therefore, it is necessary to introduce at least one substituent to the terminal naphthyl groups of the naphthalocyanine dyes without containing Si so as to improve the solubility. Examples of the substituent include halogen, an amino group, an alkyl group, an alkoxyl group, and derivatives thereof.

A variety of high dielectric polymeric materials have been reported. However, in the recording medium according to the present invention, those compounds which are highly dielectrical and show a rectangular dielectric hysterisis curve are preferably employed. Examples of such compounds include polyvinylidene fluoride, a copolymer of vinylidene fluoride and ethylene trifluoride, a copolymer of vinylidene fluoride and ethylene tetrafluoride, a copolymer of vinylidene fluoride and vinyl fluoride, a copolymer of vinylidene fluoride, ethylene tetrafluoride and propylene hexafluoride, polyvinylidene cyanide, and a copolymer of vinylidene cyanide and vinylacetate. Of these, a copolymer of vinylidene fluoride and ethylene trifluoride (hereinafter referred to as P(VDF-TrFE)) is most preferable.

A high dielectric polymeric film, such as a PVD film, for the recording layer can be prepared by one of the known solution-coating methods such as dip-coating, spray-coating, spinner-coating, blade-coating, roller-coating and curtain-coating. Of these, dip-coating, spinner-coating and roller-coating are preferable because a very thin film of the dielectric polymer can be uniformly formed by these methods.

The high dielectric polymeric recording medium according to the present invention can work as an optical memory when at least one of the electrodes, which hold the recording layer 1 therebetween, is transparent to the applied light. In the present invention, it is preferable that the lower electrode 2b be transparent or semitransparent. However, the following cases are also acceptable in the present invention; a case that both the lower electrode 2b and the upper electrode 3 are transparent, and a case that only the upper electrode 3 is transparent.

Examples of the materials for the transparent electrode for use in the present invention include indium oxide doped with tin (referred to as ITO), tin oxide, undoped indium oxide, and zinc oxide. Besides the above, many other materials are employable. These materials are subjected to vacuum-deposition, chemical vapor-deposition (referred to as CVD) or sputtering to form the transparent electrode.

Examples of the materials for the semitransparent electrode for use in the present invention include metals such as gold, platinum, silver, copper, lead, zinc, aluminum, nickel, tantalum, cobalt, niobium, palladium and tin. These metals are subjected to vacuum-deposition, CVD or sputtering to form the semitransparent electrode. The materials for the semitransparent electrode are not limited to the above metals.

Preferable examples of the materials for the substrate 2a, which supports the lower electrode 2b, include plastics such as polyethylene, polyethylene terephthalate, polypropylene, polystyrene, polyvinyl chloride, polycarbonate, polyvinyl alcohol, polyvinyl acetate, polyamide, polyimide, polyolefin, acrylic resin, phenol resin, epoxy resin, and derivatives thereof; glass; quartz; and ceramics. Of these, those materials which are transparent to the applied light and can also serve as an insulation layer are more preferable. However, the materials for the substrate are not restricted by the above-mentioned materials.

A semiconductor laser (referred to as LD) may be the most preferable light source when the mass-producibility and price are taken into consideration. Although the LD light can be applied to the recording medium from either side of the lower electrode 2b and the upper electrode 3, it is preferable that the electrode be transparent to the applied light.

Figure 2:
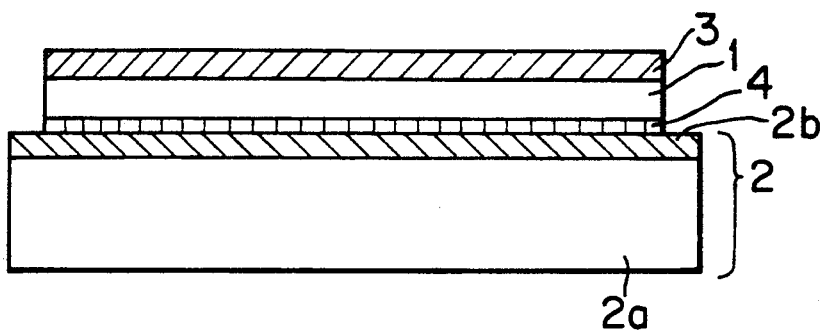

FIG. 2 is a schematic illustration of a high dielectric polymeric optical recording medium according to the present invention, which comprises an undercoat layer 4 formed between the lower electrode 2b and the recording layer 1. The undercoat layer 4 can be formed by applying or vacuum-depositing a surface-treatment agent to the surface of the lower electrode 2b. The undercoat layer 4 can improve the adhesion between the lower electrode 2b and the recording layer 1 and the preservability of the recording layer, and it can also serve as a barrier to water, gas and solvent. Of these, improvement of the adhesion between the lower electrode and the recording layer is the most important action of the undercoat layer.

Surface-treatment agents such as hexamethyl disilazane (HMDS), trimethyl chlorosilane (TMCS), dimethyl chlorosilane (DMCS), dimethyl dichlorosilane (DMDCS), bis(trimethylsilyl)acetoamide, t-butyl-dimethyl chlorosilane, bis(trimethylsilyl)trifluoroacetoamide, trimethylsilyl diphenyl urea, and bistrimethylsilyl urea are usable for the undercoat layer 4. In addition to the above, titanium coupling agents (anchor coating agents) are also employable.

The preferable thickness of the undercoat layer is 0.01 to 0.9 $\mu$m.

Figure 3:
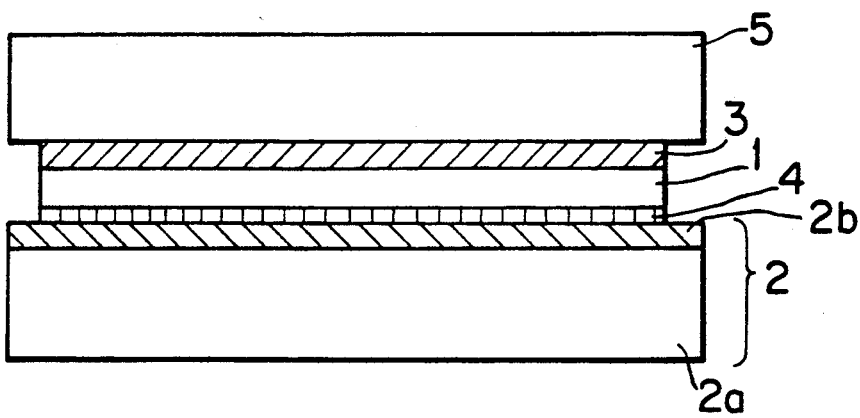

FIG. 3 is a schematic illustration of a high dielectric polymeric optical recording medium according to the present invention, further comprising a protective layer 5 on the upper electrode 3. The protective layer 5 can protect the recording medium from being dusted, stained or scratched, and improve the preservability of the recording layer. A variety of polymeric materials, silane coupling agents and glass are employable for the protective layer 5.

Figure 4:
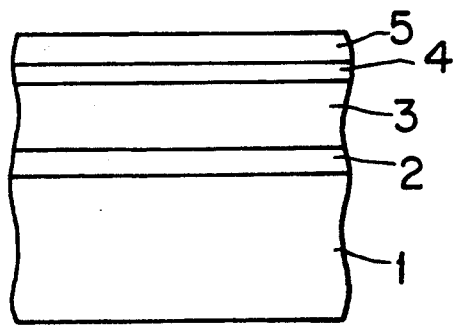

FIG. 4 is a schematic illustration of a high dielectric polymeric optical recording medium according to the present invention, further comprising an insulation layer between the recording layer and the upper electrode. In this figure, reference numeral 1 designates a substrate, reference numeral 2 designates a lower electrode, reference numeral 3 designates a recording layer, reference numeral 4 designates an insulation layer, and reference numeral 5 designates an upper electrode.

Alternatively, the insulation layer 4 can be formed between the lower electrode 2 and the recording layer 3 instead of forming between the upper electrode 5 and the recording layer 3. Furthermore, two insulation layers can be respectively formed between the lower electrode 2 and the recording layer 3, and between the recording layer 3 and the upper electrode 5.

The preferable thickness of the insulation layer 4 is 0.05 to 0.8 μm.

In order to improve the preservability of the recording medium, a protective layer may be further formed on the upper electrode 5 of the recording medium shown in FIG. 4.

Information can be recorded in the recording medium shown in FIG. 4 by applying a light from either side of the upper electrode and the substrate. In either case, the light-applied side is preferably transparent to the applied light.

Examples of the materials for the insulation layer 4 include organic materials such as thermoplastic resins, thermo-setting resins, ultraviolet ray-setting resins, electron ray-setting resins; and inorganic materials such as metal oxides and metal sulfides.

Specific examples of the above materials are homopolymers such as polyester resin, acryl resin, vinyl chloride, vinylidene chloride, styrene resin, butyral resin, amide resin, urethane resin, vinyl acetate, polycarbonate, polyvinyl pyrrolidone, silicone resin, polyvinyl alcohol, polyether, fibrous resins, polyimide, polyvinyl carbazole, epoxy resin, polyacrylonitrile, terpene resin and phenoxy resin, and copolymers thereof; natural substances such as casein and gelatine; and inorgaic materials such as zinc oxide, tin oxide, indium oxide, zinc sulfide and silicon dioxide.

The inorganic materials can be dispersed in the resins to obtain desired insulation layer 4. In addition to the above, organic metal compounds such as tetramethyl tin and trityl indium are also employable.

The insulation layer 4 can be formed by one of any known wet processes such as spraying, spinning, dipping and blading, and dry processes such as vacuum-deposition and In the present invention, the preferable thickness of the upper electrode is 0.03 to 0.5 μm, and that of the lower electrode formed on the substrate is also 0.03 to 0.5 μm.

Other features of this invention will become apparent in the course of the following description of exemplary embodiments, which are given for illustration of the invention and are not intended to be limiting thereof.

EXAMPLE 1

A soluble phthalocyanine dye containing as its main element a vanadium oxide was dispersed in a tetrahydrofuran (THF) solution of P(VDF-TrFE) in an amount of 3 wt. % based on the amount of the P(VDF-TrFE). The resulting dispersion was spin-coated onto a glass plate 1 mm in thickness, vacuum-deposited with ITO, thereby obtaining a recording layer 1 having a thickness of 1 μm. This recording layer was vacuum-deposited with aluminum to form an upper electrode, followed by a poling treatment by applying a voltage of 100 V, whereby an optical recording medium No. 1 according to the present invention was prepared.

Figure 5A:
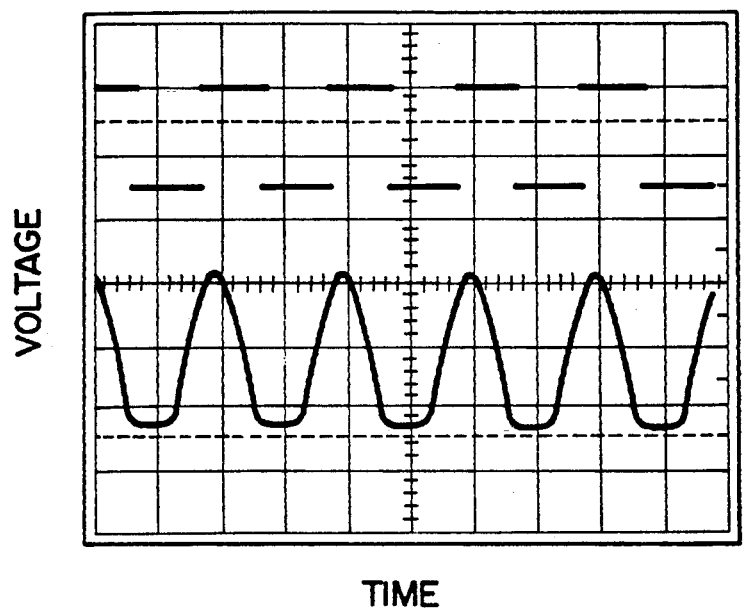
FIGS. 5a and 5b are graphs showing the phase modulation of pyroelectric current generated in an optical recording medium according to the present invention.
Figure 5B:
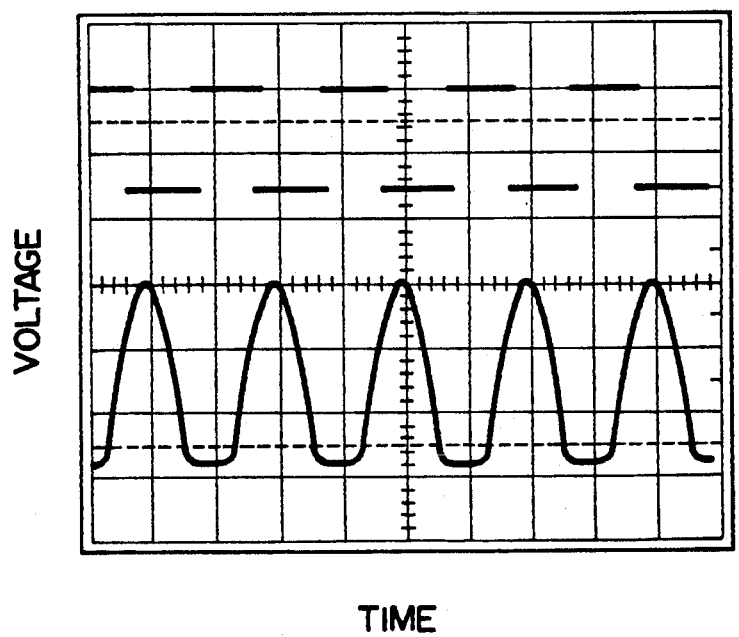

Information was recorded in the recording medium by heating some portions of the recording layer from the lower-electrode side with a semiconductor laser beam of 10 mW while impressing a reverse electric field of 25 V. Thereafter, a semiconductor laser beam of 0.1 mW weaker than the one used for information recording, chopped at a frequency of 10 kHz, was further applied to the recording layer 1. Pyroelectric current generated between two electrodes was measured in order to read out the recorded information. As a result, pyroelectric current whose phases had been completely diversed was detected as shown in FIGS. 5a and 5b. The C/N ratio of the recording medium in which information was recorded was approximately 50 dB.

EXAMPLE 2

A soluble acrylic dye having copper phthalocyanine in its side chain was dispersed in a dimethyl acetamide (DMA) solution of P(VDF-TrFE) in an amount of 3 wt. % based on the amount of the P(VDF-TrFE). The resulting dispersion was spin-coated onto a glass plate 1 mm in thickness, vacuum-deposited with ITO, thereby forming a recording layer 1 having a thickness of 1 μm. Thereafter, an optical recording medium No. 2 according to the present invention was prepared and evaluated in the same manner as in Example 1. As a result, the C/N ratio of the recording medium was found to be approximately 42 dB.

EXAMPLE 3

A soluble phthalocyanine dye containing indium as its main metal was dispersed in a DMF solution of P(VDF-TrFE) in an amount of 3 wt. % based on the amount of P(VDF-TrFE). The resulting dispersion was spin-coated onto a glass plate 1 mm in thickness, vacuum-deposited with ITO, thereby forming a recording layer 1 having a thickness of 1 μm. Thereafter, an optical recording medium No. 3 according to the present invention was prepared and evaluated in the same manner as in Example 1. As a result, the C/N ratio of this recording medium was found to be approximately 45 dB.

EXAMPLE 4

After measuring the C/N ratio, the recording medium No. 1 was subjected to a poling treatment again. By this treatment, the recorded information was completely erased, which was confirmed by measurement of the pyroelectric current generated.

In this recording medium, information was further recorded under the same conditions as in Example 1. The recorded information was reproduced with a C/N ratio of 50 dB, which is the same level as the C/N ratio for the recording medium prepared in Example 1.

It was confirmed that the above cycle of recording, reproduction, erasion and reproduction could be repeated at least 500 cycles.

EXAMPLE 5

A phthalocyanine dye having the following formula (IV) was dispersed in a DMF solution of P(VDF-TrFE) in an amount of $4.7 \times 10^{-5}$ mol per 1 g of the P(VDF-TrFE):

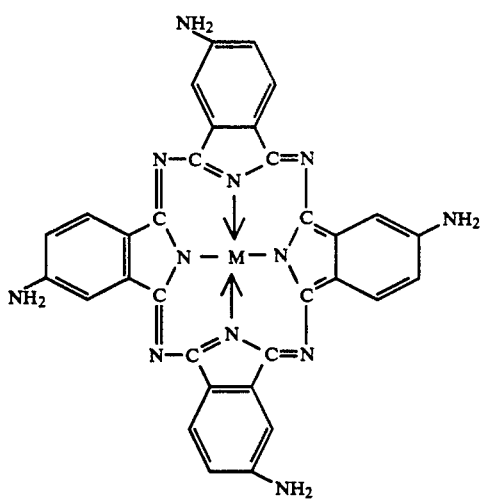

(IV)

wherein M represents vanadium oxide.

The resulting dispersion was spin-coated onto a glass plate vacuum-deposited with ITO, having a thickness of 1.2 mm and an electric resistance of 50 Ω/□, thereby forming a recording layer 1 having a thickness of 2 μm.

The absorption curve of the phthalocyanine dye in a state of a DMF solution is shown in FIG. 7.

Thereafter, the recording layer 1 was vacuum-deposited with aluminum to form an upper electrode 3 having a thickness of 1000 Å, whereby an optical recording medium No. 5 according to the present invention was prepared.

The recording medium was subjected to a poling treatment which was conducted by impressing a DC field of +180 V to the recording medium from the upper-electrode side.

While impressing a reverse electric field of −50 V from the upper-electrode side, information was recorded in the recording medium by applying a semiconductor laser beam from the lower-electrode side at a line speed of 30 mm/sec, a frequency of 3 kHz, and an intensity of 12 mW.

The recorded information was reproduced by continuously applying a semiconductor laser beam of 2 mW, at a line speed of 300 mm/sec. The C/N ratio of the resulting recording medium was approximately 52 dB.

EXAMPLE 6

A phthalocyanine dye having the following formula (V) was dispersed in a DMA solution of P(VDF/TrFE) in an amount of $4.7 \times 10^{-5}$ mol per 1 g of the P(VDF/TrFE):

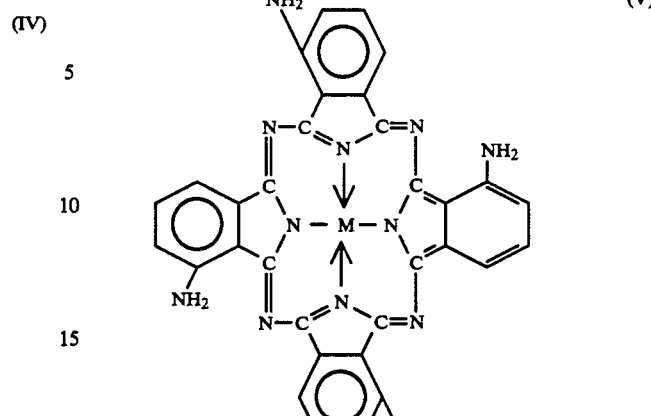

(V)

wherein M represents vanadium oxide.

By using the resulting dispersion, an optical recording medium No. 6 according to the present invention was prepared in the same manner as in Example 1, and evaluated in the same manner as in Example 5. As a result, the recorded information was reproduced with a C/N ratio of approximately 48 dB.

EXAMPLE 7

A phthalocyanine dye having the following formula (VI) was dispersed in a DMA solution of P(VDF/TrFE) in an amount of $1.6 \times 10^{-5}$ mol per 1 g of the P(VDF/TrFE):

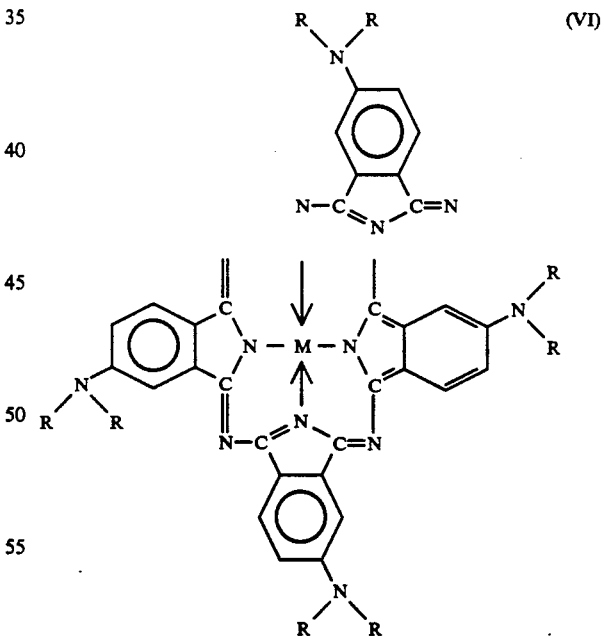

(VI)

wherein M represents a vanadium oxide, and R represents

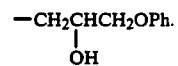

$-CH_2CHCH_2OPh.$
$\quad\quad\ \ |$
$\quad\quad\ \ OH$

By using the resulting dispersion, an optical recording medium No. 7 according to the present invention was prepared, and evaluated in the same manner as in Examples 5 and 6. As a result, it was found that the recorded information was reproduced with a C/N ratio of approximately 51 dB.

EXAMPLE 8

A semiconductor laser beam of 12 mW was each applied to the above-prepared recording media Nos. 5, 6 and 7 continuously, and scanned the recorded portions at a line speed of 30 mm/sec to erase the recorded information, while impressing an electric field of +50 V from the upper-electrode side.

A semiconductor laser beam of 2 mW was further applied to the erased portions at a line speed of 200 nun/sec. As a result, the C/N ratio was found to be −20 dB or less, and it was thus confirmed that the recorded information was completely erased.

COMPARATIVE EXAMPLE 1

A cyanine dye having the following formula (VII) was dispersed in a methylethyl ketone (MEK) solution of P(VDF-TrFE) in an amount of 3 wt. % based on the amount of the P(VDF-TrFE ).

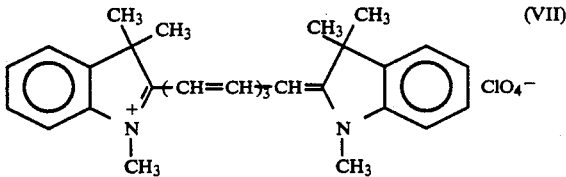

The resulting dispersion was spin-coated onto a glass plate 1 mm in thickness, vacuum-deposited with ITO, thereby forming a recording layer 1 having a thickness of 1 μm. The recording layer 1 was vacuum-deposited with aluminum to form an upper electrode, whereby a comparative optical recording medium No. 1 was prepared.

Figure 6A:
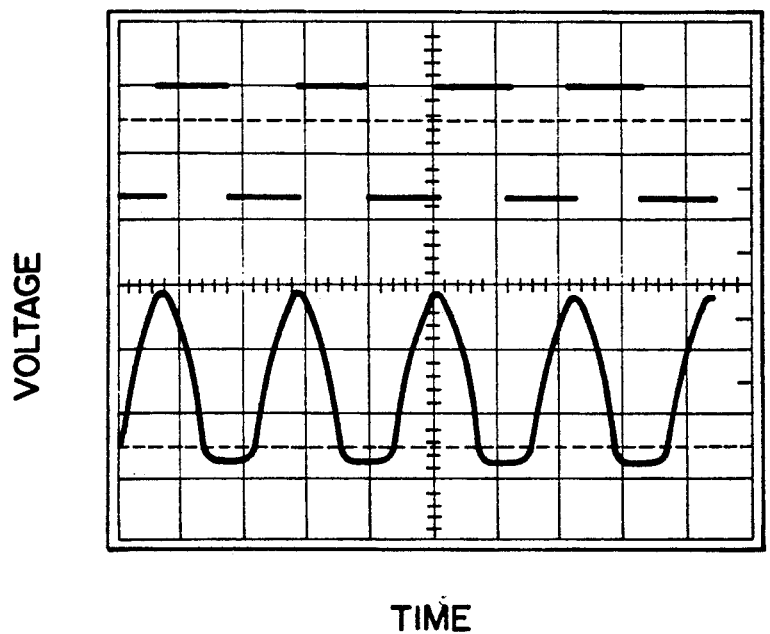
FIGS. 6a and 6b are graphs showing the phase modulation of pyroelectric current generated in a comparative optical recording medium.
Figure 6B:
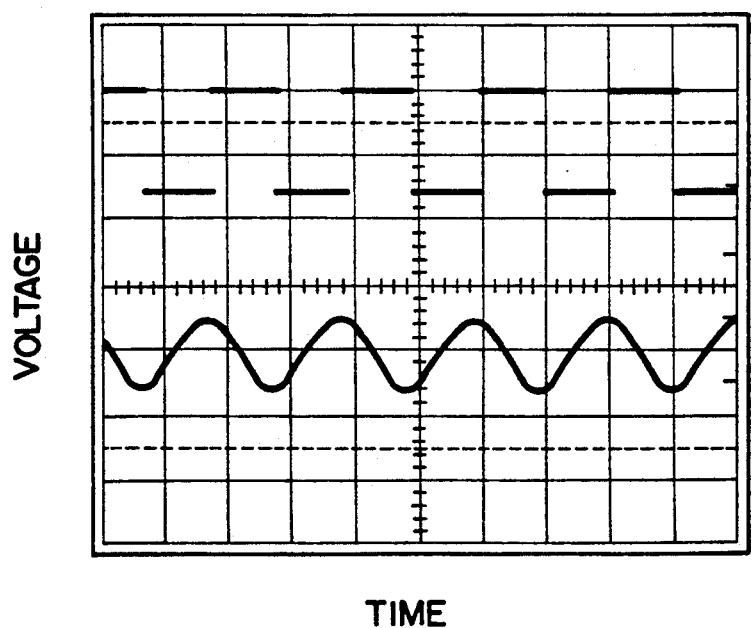

The thus prepared recording medium was subjected to a poling treatment by impressing an electric voltage of 100 V, followed by recording and reproduction of information in the same manner as in Example 1. As a result, the pyroelectric current having waves shown in FIGS. 6a and 6b was observed, and diversion in polarization was not confirmed.

COMPARATIVE EXAMPLE 2

A cyanine dye having the following formula (VIII) was dispersed in an MEK solution of P(VDF-TrFE) in an amount of 3 wt. % based on the amount of the P(VDF-TrFE).

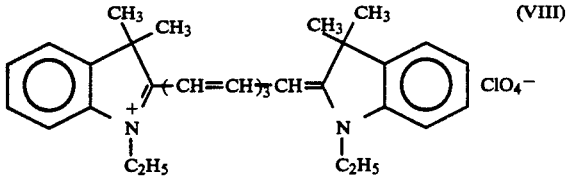

The resulting dispersion was spin-coated onto a glass plate 1 mm in thickness, vacuum-deposited with ITO, thereby forming a recording layer 1 having a thickness of 1 μm. The recording layer 1 was vacuum-deposited with aluminum to form an upper electrode, whereby a comparative optical recording medium No. 2 was prepared.

The thus prepared recording medium was evaluated in the same manner as in Example 1. As a result, no diversion of pyroelectric current was observed.

COMPARATIVE EXAMPLE 3

While heating up to a temperature of approximately 90° C., the comparative recording medium No. 1 after the evaluation carried out in Comparative Example 1 was subjected to a poling treatment by impressing an alternating electric field of 100 V. As a result, only the electric-field-impressed portions were selectively decolored completely.

The decolored portion was subjected to a secondary ion-mass spectrometric analysis. The results are shown as an IN-DEPTH PROFILE in FIG. 7. In this chart, the axis of ordinates indicates the intensity, and the axis of abscissas indicates the depth.

This chart demonstrates that fluorine ions contained in the P(VDF/TrFE) are uniformly dispersed in the recording layer, but chlorine ions contained in the cyanine dye are unevenly dispersed. Namely, chlorine ions with higher density exist at the interfaces between the upper electrode and the recording layer, and between the lower electrode and the recording layer. From this result, it was found that the dye was decolored when perchloric acid ions, which are counter ions of the cyanine dye, were dissociated and migrated to the above interfaces.

EXAMPLE 9

A soluble phthalocyanine dye containing a vanadium oxide was dissolved in a DMF solution of P(VDF-TrFE) in an amount of 3 wt. % based on the amount of the P(VDF-TrFE). The resulting solution was spin-coated onto a glass plate 1.2 mm in thickness, vacuum-deposited with ITO, followed by subjecting to an annealing treatment at 140° C. for 1 hour, thereby obtaining a recording layer 1 having a thickness of 2 μm.

The recording layer was spin-coated with an ethylalcohol solution of polyamide resin (Trademark "CM-8000", made by Toray Industries, Inc.), thereby forming an insulation layer having a thickness of 0.2 μm.

The insulation layer was vacuum-deposited with aluminum to form an upper electrode, whereby an optical recording medium No. 9 according to the present invention composed of an upper electrode - insulation layer - recording layer - lower electrode - substrate was prepared.

The above-prepared recording medium was subjected to a poling treatment by impressing a voltage of 220 V to the electrodes. Thereafter, information was recorded in the recording medium by applying a semiconductor laser beam of 12 mW, condensed to 5 μm in diameter, from the lower-electrode side while impressing a reverse electric field of 50 V.

The recorded information was read out by applying a semiconductor laser beam of 0.2 mW, chopped at a frequency of 10 kHz, to the recording layer, and measuring the generated pyroelectric current. As a result it was found that the S/N ratio was approximately 40 dB, and the C/N ratio was approximately 55 dB. The diameter of recorded spot was approximately 6 μm, and thermal diffusion was found small.

As described above, the shortcomings of the conventional high dielectric polymeric optical recording medium can be overcome by the present invention.

Namely, the low light-to-heat conversion efficiency and poor sensitivity of the conventional recording medium can be improved by the recording medium of the present invention which comprises a recording layer containing a dielectric polymeric material and a specific nonionic dye dispersed in the polymeric material.

Since, the above nonionic dye has high heat-resistance and electric potential-resistance, stability and reliability of the recording medium can also be improved by employing the recording layer comprising the nonionic dye.

The high dielectric polymeric optical information recording medium according to the present invention can thus be put to practical use. The recording medium of the present invention is free from spark discharge, and information can be recorded therein with high density and sensitivity.

What is claimed is:

1. A high dielectric polymeric optical recording medium for recording information by heating portions of the recording medium corresponding to information to be recorded by being exposed to a beam of light, followed by the application of a reverse electric field to the recording medium, thereby selectively reversing the polarity of the heated portions in said recording medium, comprising
   a lower electrode,
   a recording layer formed on said lower electrode, which comprises a high dielectric polymeric composition comprising a high dielectric polymeric material having a rectangular dielectric hysteresis curve and a nonionic dye serving as a light-absorption agent which is compatible with or dispersible in said high dielectric polymeric material,
   an upper electrode formed on said recording layer, and
   an insulation layer interposed at least between said recording layer and said upper electrode or between said lower electrode and said recording layer.

2. The high dielectric polymeric optical recording medium as claimed in claim 1, wherein said nonionic dye has an molar absorbance index ($\epsilon$) of $10^4$ $mol^{-1} \cdot l \cdot cm^{-1}$ or more near the wavelength of a beam of light applied thereto.

3. The high dielectric polymeric optical recording medium as claimed in claim 1, wherein said nonionic dye is selected from the group consisting of a phthalocyanine dye, a naphthalocyanine dye, a benzene dithiol dye, a naphthoquinone dye, and an anthraquinone dye.

4. The high dielectric polymeric optical recording medium as claimed in claim 3, wherein said phthalocyanine dye has the following formula (I):

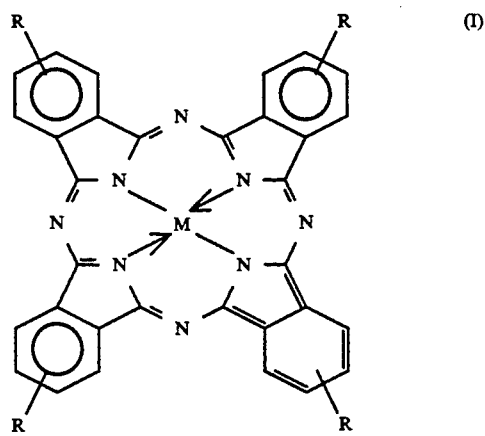

wherein
   M represents tin, zinc, titanium, vanadium, and indium; and
   R represents an alkyl group having 1 to 22 carbon atoms, an alkoxyl group having 1 to 22 carbon atoms, halogen, an amino group, an amino group substituted with an alkyl or alkoxyl group having 1 to 10 carbon atoms.

5. The high dielectric polymeric optical recording medium as claimed in claim 3, wherein said naphthalocyanine dye has the following formula (III):

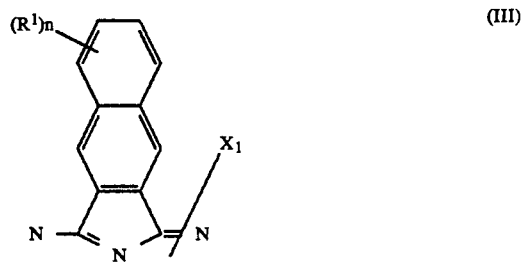

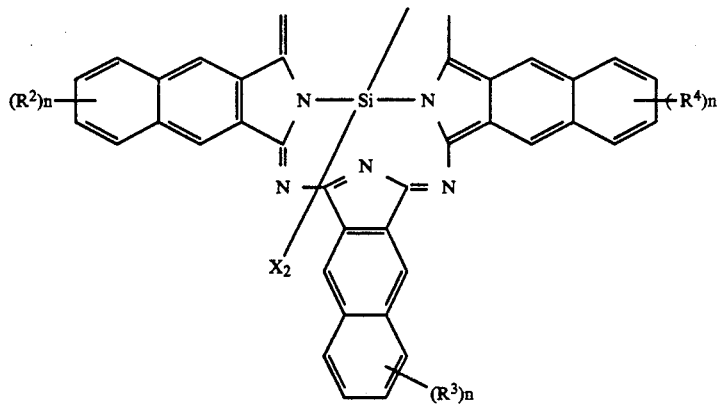

wherein
- $R^1$, $R^2$, $R^3$, $R^4$ are identical or different, and represent a linear or branched alkyl group having 1 to 22 carbon atoms or halogen;
- n is identical or different, and represents an integer of from 0 to 6; and
- $X^1$ and $X^2$ are identical or different, and represent a group selected from the group consisting of —R, —At, —OR, —OAr, —OSi(R)$_3$, —OSi(OR)$_3$ and —OSi(OAr)$_3$, in which R represents a linear or branched alkyl group having 1 to 22 carbon atoms, and Ar represents a group selected from the group consisting of a phenyl group, a substituted phenyl group, a benzyl group and a substituted benzyl group.

6. The high dielectric polymeric optical recording medium as claimed in claim 1, wherein the amount of said nonionic dye is less than 5 wt. % of the amount of said high dielectric polymeric material.

7. The high dielectric polymeric optical recording medium as claimed in claim 1, wherein said high dielectric polymeric material is selected from the group consisting of polyvinylidene fluoride, a copolymer of vinylidene fluoride and ethylene trifluoride, a copolymer of vinylidene fluoride and ethylene tetrafluoride, a copolymer of vinylidene fluoride and vinyl fluoride, a copolymer of vinylidene fluoride, ethylene tetrafluoride and propylene hexafluoride, polyvinylidene cyanide, and a copolymer of vinylidene cyanide and vinylacetate.

8. The high dielectric polymeric optical recording medium as claimed in claim 1, wherein said lower electrode and said upper electrode are each made of a material selected from the group consisting of indium oxide, indium oxide doped with tin, tin oxide, zinc oxide, gold, platinum, silver, copper, lead, zinc, aluminum, nickel, tantalum, cobalt, niobium, palladium, and tin.

9. The high dielectric polymeric optical recording medium as claimed in claim 1, wherein the thickness of said recording layer is in the range of from 0.3 to 5 μm.

10. The high dielectric polymeric optical recording medium as claimed in claim 1, wherein the thickness of said lower electrode is in the range of from 0.03 to 0.5 μm.

11. The high dielectric polymeric optical recording medium as claimed in claim 1, wherein the thickness of said upper electrode is in the range of from 0.03 to 0.5 μm.

12. The high dielectric polymeric optical recording medium as claimed in claim 1, further comprising an undercoat layer interposed between said lower electrode and said recording layer.

13. The high dielectric polymeric optical recording medium as claimed in claim 1, wherein said undercoat layer comprises a material selected from the group consisting of hexamethyl disilazane, trimethyl chlorosilane, dimethyl chlorosilane, dimethyl dichlorosilane, bis(-trimethylsilyl)-acetoamide, t-butyldimethyl chlorosilane, bis(trimethylsilyl)trifluoroacetoamide, trimethylsilyl diphenyl urea, bistrimethylsilyl urea, and titanium coupling agents.

14. The high dielectric polymeric optical recording medium as claimed in claim 1, wherein the thickness of said undercoat layer is in the range of from 0.01 to 0.9 μm.

15. The high dielectric polymeric optical recording medium as claimed in claim 1, further comprising a protective layer formed on said upper electrode.

16. The high dielectric polymeric optical recording medium as claimed in claim 15, wherein said protective layer is made of a material selected from the group consisting of polymeric materials, silane coupling agents and glass.

17. The high dielectric polymeric optical recording medium as claimed in claim 1, wherein said insulation layer comprises a material selected from the group consisting of a thermoplastic resin, a thermosetting resin, an ultraviolet ray-setting resin, an electron ray-setting resin, a metal oxide and a metal sulfide.

18. The high dielectric polymeric optical recording medium as claimed in claim 1, wherein the thickness of said insulation layer is in the range of from 0.05 to 0.8 μm.

* * * * *

UNITED STATES PATENT AND TRADEMARK OFFICE
CERTIFICATE OF CORRECTION

PATENT NO. : 5,326,678
DATED : July 5, 1994
INVENTOR(S) : Kojima et al.

It is certified that error appears in the above-identified patent and that said Letters Patent is hereby corrected as shown below:

Column 1, line 66 "to Pt", should read --to Pr--;

line 68 "to 2Pt, where "Pt" de-", should read --to 2Pr, where "Pr" de- --.

Column 9, line 27 "inorgaic" should read --inorganic--;

line 37 after "and", insert --CVD.--.

UNITED STATES PATENT AND TRADEMARK OFFICE
CERTIFICATE OF CORRECTION

PATENT NO. : 5,326,678
DATED : July 5, 1994
INVENTOR(S) : Kojima et al.

It is certified that error appears in the above-identified patent and that said Letters Patent is hereby corrected as shown below:

Column 12, lines 35-43, Drawing EXAMPLE 7

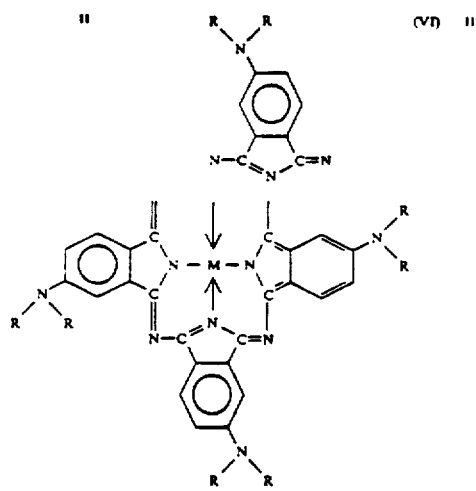

should read

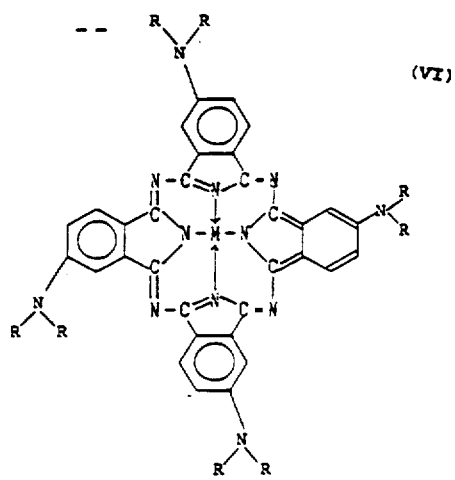

UNITED STATES PATENT AND TRADEMARK OFFICE
CERTIFICATE OF CORRECTION

PATENT NO. : 5,326,678
DATED : July 5, 1994
INVENTOR(S) : Kojima et al.

It is certified that error appears in the above-identified patent and that said Letters Patent is hereby corrected as shown below:

Column 13, line 15 "nun/sec.", should read --mm/sec.--

Column 16, line 1 "an molar", should read --a molar--.

Column 17, line 28 "-At,", should read -- -Ar,--.

Signed and Sealed this

Twenty-sixth Day of September, 1995

Attest:

BRUCE LEHMAN

Attesting Officer      Commissioner of Patents and Trademarks